United States Patent Office 3,536,505
Patented Oct. 27, 1970

3,536,505
HIGH DENSITY REFRACTORY MATERIALS AND
METHOD FOR PRODUCTION OF SAME
Jean-Pierre Kiehl and Georges Valentin, Lyon, France,
assignors to Societe Generale des Produits Refractaires,
Paris, France, a corporation of France
No Drawing. Filed Aug. 22, 1967, Ser. No. 662,276
Claims priority, application France, Aug. 26, 1966,
74,294; Jan. 16, 1967, 91,257
Int. Cl. C04b 35/02, 35/42
U.S. Cl. 106—58      4 Claims

ABSTRACT OF THE DISCLOSURE

High density shaped refractory products having low porosity and creep deformation prepared from a mixture of raw roasted refractory material comprising magnesia or magnesia and one or more compounds selected from $Cr_2O_3$, $TiO_2$, natural chromite and calcinated dolomite wherein the material consists of at least 50% grain size between 5 mm. and 0.2 mm., at least half of which is between 5 mm. and 1 mm. to 1.5 mm.; less than 50% grain size smaller than $200\mu$; 1% to 6% recrystallization additions smaller than $74\mu$ and 0.2% to 1% organic binder; and wherein said mixture is shaped and then fired at between 1550° C. and 1680° C. to form a transient viscous phase of high vapor pressure to form monocrystals and crystalline aggregates and cooled.

---

Our invention relates in general to a high density refractory product and in particular to a high density, thermally stable low porosity refractory brick and to the method of producing the brick.

Our refractory bricks are generally magnesium oxide, one of the most commonly used oxides for industrial refractory applications. However, our invention is not limited solely to the use of magnesium oxide since we have found that the addition thereto of at least one other refractory oxide results in a thermally stable product having high density and low porosity.

Substantial advances have recently been made in high temperature sintering of crude raw refractory materials in order to obtain chamottes or refractory clays. Magnesia chamottes of high purity, low porosity and high density are now available, from magnesite and from hydrates of magnesia extracted from sea water.

These advances have not been carried over into the production of magnesia bricks, however. Invariably, these bricks are still produced with an open porosity of 15% or more. As a rule, these bricks begin to creep under the load from 1350° C. to 1400° C. due to the inadequate development of periclase monocrystals. This is true even when the bricks are fired at temperatures exceeding 1650° C.

Although it is possible to produce magnesia fragments or parts of very low porosity or nonexistent open porosity, this applies only to very small fragments or parts obtained by sintering a composition of very fine granulation at very high temperature. For example, a grain size smaller than half a millimeter, based on either caustic magnesia or dead roasted magnesia or on a mixture of the two, is required throughout. These fragments undergo a 10 to 15% shrinkage during firing. The problem of shrinkage and the high cost of the process prevent application of the process to the production of refractory products for use in iron metallurgy, cement production, glass-making, etc.

It is possible to produce products or parts of dense magnesia having a low porosity by electric furnace fusion, followed by casting and cooling in molds. This technique, however, suffers from the creation of shrinkage holes caused by the substantial difference in densities between liquid magnesia and crystalline magnesia.

Our invention overcomes these difficulties by providing an economical method for producing a refractory product of very low porosity and very high density having a remarkable structural homogeneity. These products are easily obtainable in standard sizes for use in industrial furnaces.

Generally, the products of our invention contain at least 92% dead burned magnesia or a combination of dead burned magnesia and one or more of $Cr_2O_3$, $TiO_2$, natural chromite and calcinated dolomite with the proportion of dead burned magnesia to the refractory materials ranging from 20% to 80%. The products are characterized by a homogeneous structure of periclase monocrystals or homogeneous combination of monocrystals of the crystalline raw materials. The crystals are substantially contiguous and of a size greater than the initial crystals. The crystals are each of substantially the same size. The products of crystalline aggregates formed by our process have a specific gravity at least equal to 3 and with an open porosity not more than 8% and generally less than 5%. The thermal stability is such that the deformation caused by creep will be lower than 0.5% after 24 hours at 1500° C. followed by 100 hours at 1500° C. under a load of 2 kg./cm.$^2$. The products have a good mechanical strength when cold and a breaking modulus under bending stress that is at least two times higher than those of the conventional products of similar MgO content.

The monocrystals have a diameter greater than $20\mu$ and the crystalline aggregates each have a size between $200\mu$ and $800\mu$. The crystalline aggregates are generally separated by not more than very thin boundaries formed by the residue of the recrystallization addition utilized with the mixture and impurities that are not syncrystallized in the periclase lattice.

The process for obtaining our novel product comprises starting with a dead roasted magnesia chamotte or magnesia refractory clay or grains of a purity that corresponds to that desired in the final product. It is also possible to start with a material having a magnesia content from 20% to 80% by weight and at least one other refractory material selected from the group consisting of $Cr_2O_3$, $TiO_2$, natural chromite, and calcinated dolomite. In either case, the process is the same and the products obtained are characterized by high density, low porosity, and high thermal stability. A mixture (the mixture herein referred to is either the dead burned magnesia also said chamotte or grog, alone or in combination with the other refractory materials) is prepared in which, by weight, at least 50% of the grain sizes lie between 5 mm. and 0.2 mm., and of this amount at least 50% are between 5 mm. and 1.5 mm.; less than 50% of the mixture is less than $200\mu$. To this mixture is added from 1% to 6% recrystallization additions having a size less than $74\mu$. These additions are selected from a group consisting of $SiO_2$-$CaO$ systems and $B_2O_3$-$CaO$ systems. The purpose of these additions is to promote the formation, during heating, of a transient viscous phase from which magnesia will recrystallize into larger monocrystals than the initial monocrystals and into crystalline aggregates. The phase should be sufficiently viscous to prevent deformation of the shapes during firing. The major part of these additions is eliminated by volatization during firing.

The $SiO_2$-$CaO$ system, at firing, allows the formation of volatile silicates in ponderal proportions lying between 25% and 75% of CaO related to the $SiO_2$+$CaO$ total. The $B_2O_3$-$CaO$ system allows the formation of mono-, di-, or tricalcic borates.

The components of the additions may be introduced alone, in the form of quartz, cristobalite, vitreous silica, or associated with lime in the form of di- or tricalcic silicate, or released at high temperature from an unstable silicate such as zircon. Boric anhydride may be introduced in the form of boric acid, a borocalcic ore or a compound releasing the anhydride at high temperature. The calcium oxide may be introduced in the form of oxide, carbonate, hydrate, or silicate.

To this mixture is added 0.2 to 1.0% organic binder, for example, bisulphite lye. This mixture is then shaped by known means, for example, pressing, vibrating, ramming, etc. The shaped mixture is then fired to a temperature between 1550° C. and 1650° C. for magnesia and between 1600° C. and 1680° C. for magnesia and at least one of the other refractory materials. The speed of the temperature rise and the maintenance of the temperature depend upon the conditions of each operation, in particular, on the volume of the shapes to be fired. The temperature may be maintained for a period between 2 and 10 hours and the temperature rise may last for a period of two days. The fired mixture is then cooled.

According to our process, the initial grains pass into the viscous phase, from which are formed larger monocrystals. The totality of the mass is not liquid at any one point in time. Passages into the liquid phase and then recrystallization is progressive. The shrinkage during the first rise in firing temperature is less than 5%, and is frequently between 2% and 3%. After this treatment, the refired bricks or shapes have a shrinkage of less than 2% even if the temperature rises at 2000° C.

The advantages of our invention are shown by comparison of micrographs of a brick made by a conventional process and a brick made according to the invention at 100× magnification. In the conventionally made brick the grains consist of small periclase monocrystals having a size of a few microns at most. The crystals are immersed in a ceramic binder formed by small monocrystals analogous to those forming the grains. The monocrystals of periclase have not practically developed into the grains as well as into the binder.

The product made according to the invention consists essentially of monocrystals having dimensions approximately identical to each other which are generally between $20\mu$ and $100\mu$. The structure is sufficiently close-set to prevent the appearance on a micrograph of crystals, referred to as "crystalline aggregates" into which the monocrystals are grouped. By contrast, these crystals may be seen under examination with magnification. Strips corresponding to concentrations of impurities and/or to non-volatized residues of recrystallization additions appear at the boundaries of the crystals.

The following nonlimiting examples illustrate our invention.

EXAMPLE I

Production of magnesia bricks of 220 x 110 x 60 mm.

The raw material was a magnesia chamotte or refractory material having an apparent specific gravity of 3.25 and a porosity of 5%. The chemical composition of the raw material was as follows:

| | Percent by weight |
|---|---|
| MgO | 98.1 |
| $SiO_2$ | 0.6 |
| $Al_2O_3$ | Traces |
| $Fe_2O_3$ | 0.5 |
| $TiO_2$ | Traces |
| CaO | 0.8 |

A mixture was prepared containing, by weight:

| | Percent |
|---|---|
| Grains of 1.5 to 4 mm. | 30 |
| Grains of 0.2 to 1.5 mm. | 30 |
| Powder, smaller than 0.1 mm. | 35 |
| Monocalcic silicate, melted and crushed to a maximum size of 74 microns | 4 |
| Organic binder (bisulphite lye) | 1 |

This mixture was humidified and shaped in a hydraulic press at 1000 kg./cm.$^2$. Its specific gravity when crude and dry was 3. The firing temperature of 1650° C. was reached in two days and was maintained for four hours. Cooling was performed in 24 hours. The linear shrinkage during firing amounted to 3%, and the weight loss during firing amounted to 4% of dry.

The composition of the final product was, by weight:

| | Percent |
|---|---|
| MgO | 97.5 |
| $SiO_2$ | 0.8 |
| $Al_2O_3$ | Traces |
| $Fe_2O_3$ | 0.5 |
| CaO | 1.2 |

Periclase crystals of 400 to 800 microns clearly appeared under magnification and monocrystals between approximately 20 and 100 microns were visible.

The characteristics of the fired bricks were:

| | |
|---|---|
| Apparent specific gravity | 3.20. |
| Open porousness | 1 percent. |
| Mechanical strength (crushing cold) | 1500 kg./cm.$^2$. |
| Breaking modulus, cold | 400 kg./cm.$^2$. |
| Subsidence under load of 2 kg./cm.$^2$: | |
| At 1680° C. | 0.5 percent. |
| At 1720° C. | 2 percent. |
| Creep under load, 24 hours at 1500° C. followed by 2 kg./cm.$^2$ for 100 hours at 1500° C. | 0.2 percent. |

EXAMPLE II

Production of magnesia bricks of 230 x 115 x 65 mm. size

The raw material was a magnesia chamotte having apparent specific gravity of 3.20 and a porosity of 3.2%. The chemical composition of the raw material was as follows:

| | Percent |
|---|---|
| MgO | 95.1 |
| $SiO_2$ | 0.8 |
| $Al_2O_3$ | 0.4 |
| $Fe_2O_3$ | 0.8 |
| $TiO_2$ | Traces |
| CaO | 2.9 |

A mixture was prepared containing, by weight:

| | Percent |
|---|---|
| Grains of 1.5 to 4 mm. | 30 |
| Grains of 0.2 to 1.5 mm. | 20 |
| Powder, smaller than 0.1 mm. | 44 |
| Crushed monocalcic borate less than 74 microns | 5 |
| Organic binder (bisulphite lye) | 1 |

This mixture, humidified, was shaped by ramming. The specific gravity when crude and dry was 2.95. The firing temperature of 1650° C. was reached in two days and was maintained for four hours. Cooling was performed in 24 hours. The linear shrinkage during firing was 4% and the weight loss during firing amounted to 4% of dry.

The composition of the final product was, by weight:

| | Percent |
|---|---|
| MgO | 93.9 |
| $SiO_2$ | 0.8 |
| $Al_2O_3$ | 0.4 |
| $Fe_2O_3$ | 0.8 |
| $TiO_2$ | ---- |
| CaO | 3.6 |
| $B_2O_3$ | 0.5 |

Crystals of periclase of 600 to 800 microns distinctly appeared under magnification and monocrystals of sizes between approximately 20 and 100 microns were visible.

The characteristics of the fired bricks were:

Apparent specific gravity—3.10.
Open porousness—4%.
Mechanical strength (crushing cold)—1000 kg./cm.$^2$.
Breaking modulus, cold—315 kg./cm.$^2$.
Subsidence under load of 2 kg./cm.$^2$:
   at 1650° C.—0.5%.
   at 1690° C.—2%.
   at 1720° C.—5%.
Creep under load, 24 hours at 1500° C. followed by 2 kg./cm.$^2$ for 100 hours at 1500° C.—0.3%.

While we have described specific embodiments of our invention it is to be understood that it may be embodied within the scope of the appended claims.

We claim:

1. A method for producing a high density, low porosity thermally stable burned refractory shape comprising:
   (A) preparing a size graded batch consisting essentially of 1 to 6% by weight of calcium borate sized less than 74 microns, 0.2 to 1% by weight of an organic binder, at least 20% by weight dead burned magnesia and the remainder of the batch comprising refractory grains selected from the group consisting of chrome ore, calcined dolomite, TiO$_2$, Cr$_2$O$_3$ and mixtures thereof;
   (B) forming the batch into a shape;
   (C) firing the shape at a temperature between 1550° C. and 1680° C.; and
   (D) cooling and recovering the shape having a homogeneous mixture of crystals and a porosity less than 8%.

2. A process according to claim 1 wherein said batch comprises between 20 and 80% dead burned magnesia.

3. A process according to claim 1 wherein said batch comprises at least 92% dead burned magnesia.

4. A burned refractory product having high density, low porosity and being thermally stable, prepared from a batch consisting essentially of 1 to 6% by weight of calcium borate sized less than 74 microns, 0.2 to 1% by weight of an organic binder, at least 20% by weight dead burned magnesia and the remainder of the batch comprising refractory grains selected from the group consisting of chrome ore, calcined dolomite, TiO$_2$, Cr$_2$O$_3$ and mixtures thereof, said product having been burned at a temperature between 1550° C. and 1680° C. such that said shape comprises an homogeneous mixture of crystals and has a porosity less than 8%.

References Cited

UNITED STATES PATENTS

| | | | |
|---|---|---|---|
| 3,180,744 | 4/1965 | Davies et al. | 106—59 |
| 3,194,672 | 7/1965 | Davies et al. | 106—59 |
| 3,199,994 | 8/1965 | Davies | 106—59 |
| 3,309,209 | 3/1967 | Martinet et al. | 106—58 |
| 3,316,107 | 4/1967 | Havranek | 106—59 |
| 3,378,383 | 4/1968 | Van Dreser | 106—58 |
| 3,390,002 | 6/1968 | Davies et al. | 106—58 |
| 3,395,031 | 7/1968 | Campbell et al. | 106—58 |

FOREIGN PATENTS 1,001,604   8/1965   Great Britain.

JAMES E. POER, Primary Examiner

U.S. Cl. X.R.

106—59, 63